United States Patent [19]

Markwardt et al.

[11] Patent Number: 4,924,764
[45] Date of Patent: May 15, 1990

[54] METHOD AND DEVICE FOR THE BATCHWISE PRODUCTION OF AERATED SWEETS IN A PRESSURE-BEATING MACHINE

[75] Inventors: Klaus Markwardt, Laatzen; Reinhard Mergelsberg, Garbsen, both of Fed. Rep. of Germany

[73] Assignee: Otto Hänsel GmbH, Hanover, Fed. Rep. of Germany

[21] Appl. No.: 201,833

[22] Filed: Jun. 3, 1988

Related U.S. Application Data

[62] Division of Ser. No. 894,259, Aug. 7, 1986, Pat. No. 4,774,100.

[51] Int. Cl.$^5$ .............................................. A47J 27/66
[52] U.S. Cl. .................................... 99/348; 99/324; 426/519; 426/572
[58] Field of Search ................... 99/324, 348; 426/572, 426/474, 564, 519, 510; 366/102

[56] References Cited

U.S. PATENT DOCUMENTS

| | | | |
|---|---|---|---|
| 1,123,092 | 12/1914 | Calvert | 366/102 X |
| 1,949,791 | 3/1934 | Epstein et al. | 426/519 X |
| 2,035,619 | 3/1936 | Robison | 426/474 |
| 2,466,895 | 4/1949 | Horneman et al. | 426/519 X |
| 2,600,569 | 6/1952 | Oakes | 426/474 |
| 3,556,812 | 1/1971 | Krohn | 426/572 |
| 3,557,717 | 1/1971 | Chivers | 426/474 X |
| 3,846,570 | 11/1974 | Vetter et al. | 426/519 X |
| 3,899,606 | 8/1975 | Forkner | 426/459 X |
| 4,001,457 | 1/1977 | Hegadorn | 426/572 |
| 4,038,423 | 7/1977 | Hayward et al. | 426/90 X |
| 4,282,263 | 8/1981 | Barnes et al. | 426/572 |
| 4,390,450 | 6/1983 | Gibson et al. | 252/363.5 X |

Primary Examiner—Stephen Marcus
Assistant Examiner—Christine A. Peterson
Attorney, Agent, or Firm—Max Fogiel

[57] ABSTRACT

An arrangement for batchwise production of aerated sugar masses, in which a separate cooker is connected to a pressure beating machine for boiling a sugar solution to be aerated at atmospheric pressure without subsequent vacuum treatment in the cooker. The boiled solution is transferred into the pressure beating machine where it is vacuumized by an additional boiling under vacuum to obtain a substantially viscous sugar mass. The solution in the pressure beating machine is then mixed after vacuumizing with added whipping agent solution. Thereafter, the mixed solution is beat in the pressure beating machine, and compressed air is added to produce an aerated sugar mass that consists substantially of cooked and vacuumized sugar solution, whipping agent solution, and air. The vacuumizing and the beating are carried out only in the pressure beating machine. The vacuumizing reduces the water content of the sugar mass through vaporization.

10 Claims, 1 Drawing Sheet

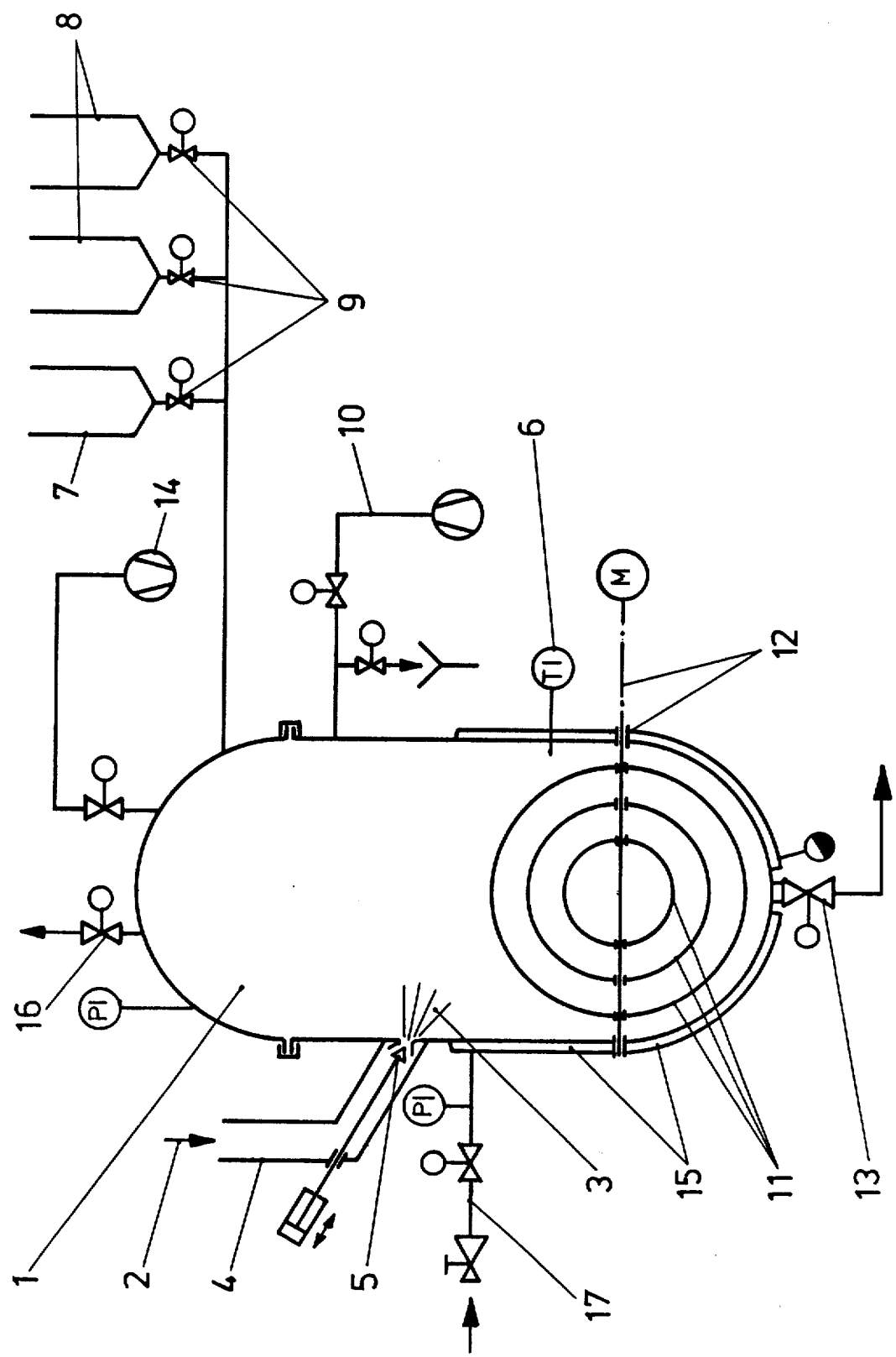

4,924,764

METHOD AND DEVICE FOR THE BATCHWISE PRODUCTION OF AERATED SWEETS IN A PRESSURE-BEATING MACHINE

This is a division of Application Ser. No. 894,259 filed Aug. 7, 1986, and now U.S. Pat. No. 4,774,100 issued Sept. 27, 1988.

BACKGROUND OF THE INVENTION

The invention concerns a method and a device for the batchwise production of aerated sweets in a pressure-beating machine. Methods and devices of that kind are already known in practice in the most diverse forms of embodiment and described in the relevant literature. For this purpose, "Handbuch für die Zuckerwaren Silesia Confiserie Manual Number 1 of Meiners+Joike, 1969, pages 417 et seq." may be referred to. In every case, one operates on about the same principle.

A sugar solution brought in a preparatory machine to the final dry substance proportion and to the processing temperature, usually through boiling and underpressure treatment, is to be so treated under pressure together with a bearing medium solution in common or one after the other that the gas, preferably air, required for the attainment of low specific weights and the desired consistency is worked homogenously into the mass.

The demanded residual water content connected with the required processing temperature determines the usually applied process course, i.e. boiling of the sugar solution and the simultaneous or subsequent underpressure treatment (boiling point reduction). Due to the underpressure treatment, temperature lowering through water evaporation, the sugar mass has a high viscosity which must be taken into account during the feeding to the pressure-beating machine. Large cross-sections in the feed tube ducts, large fittings and in part pressure enhancement are required in order not to let the charging times become too great. An upstream boiling apparatus must in the boiler space be designed to be so large that it affords sufficient space for the sugar mass foaming under underpressure.

SUMMARY OF THE INVENTION

It is the task of the invention to indicate an improved method, which functions free of trouble, necessitates a simplified machine installation and at the same time increases the throughput per unit time (through processes devolving in parallel), with maintenance of the same quality parameters of the finished product.

This problem is solved according to the invention thereby, that the sugar mass to be aerated is boiled with the omission of an underpressure treatment, is conducted to the pressure-beating container and brought in this to the required residual water content and the required further processing temperature at underpressure before the beating, whereupon a bearing of the mass takes place in an in itself known manner.

The pressure-beating machine is charged with a boiled mass of low viscosity and not yet treated by underpressure. The underpressure treatment is redisposed into the pressure container of the beating machine and runs in parallel with the introduction of the sugar mass. This entails the advantages that the underpressure takes over the conveying of the mass and that the mass entering into the underpressure container is sprayed and the water evaporation thereby takes place more effectively through underpressure.

Whilst it is already known in the production of hard boiled sweets to undertake the spraying of boiled sugar mass on entry into a space standing under underpressure, the use of such a method step in the production of, for example, foam sugar masses, which are beaten after spraying and after underpressure treatment, is quite new and inventive.

Further details of the equipment operating by the method according to the invention are reproduced in the attached drawing and mentioned in the claims regarding the device.

BRIEF DESCRIPTION OF THE DRAWINGS

A schematic view showing the essential elements, in accordance with the present invention.

DESCRIPTION OF THE PREFERRED EMBODIMENTS

The upstream boiling apparatus can be kept similar in terms of volume, since the foaming-up of the mass at underpressure disappears. The same applies to the fittings and pipe ducts 4 between the boiling apparatus and the beating machine 1, since the mass 2 is still of low viscosity in this region.

After the introduction of the boiled sugar mass into the beating machine 1 by vacuum enhancement or also only through gravity, the inlet valve 5 is closed and a further underpressure treatment could follow. The process is monitored by a temperature sensor 7 introduced at a suitable place.

Since the beater pressure container 1 is designed in terms of volume for highly aerated sweets, sufficient space offers itself for the sugar mass foaming up at underpressure.

With the aid of the underpressure, the beating medium solution 7 and possibly other ingredients 8 are sucked into the pressure container after opening of the inlet valves 9. The actual beating process takes place through filling of the beater space with the beater gas (air) 10 standing under pressure and rotation of the beater basket 11.

In summary, it may be stated once again that the still unboiled sugar mass is put into the pressure-beating container without spray effect 3 by way of the inlet valve 5. The steam admitted through line 17 into the double shell of the same effects the boiling of the sugar mass. The vapour valve is closed only thereafter and the underpressure treatment for the purpose of attainment of the required residual water content and the processing temperature is initiated. Finally, the aeration of the mass under internal excess pressure takes place through inducting the additional ingredients, such as for example aromatic substances, beating media or the like, into the container of the beater machine.

The emptying of the container after the beating takes place in known manner by way of the outlet valve 13 with the aid of the beater pressure.

Besides the beating basket 11 in the pressure container 1 and the mechanical drive and sealing parts 12, connections for a vacuum pump 14 and equipments, respectively, for the vacuum treatment of the sugar mass and for the performance of the beating operation under internal excess pressure are provided.

The pressure-beating machine is provided with a steam connection 17. The cylindrical pressure-beating container 1 is equipped with a hemispherical base and a double-walled unit 15 in the region of the hemispherical base and of the cylindrical part. The pressure-beating container 1 is to be operated at atomospheric pressure with opened vapor valve 16 or at vacuum by means of a vacuum pump when the demanded through put and the desired finished product permit such a procedure.

SUMMARY

The invention concerns a method for the batchwise production of aerated sweets in a pressure-beating machine, wherein—according to the invention—the sugar mass to be aerated is boiled with the omission of an underpressure treatment, is conducted to the pressure-beating container and brought in this to the required residual water content and the required further processing temperature at underpressure before the beating, whereupon a beating of the mass takes place in an in itself known manner.

We claim:

1. Apparatus for batchwise production of aerated sugar masses comprising: a pressure beating machine; a separate cooker connected to said pressure beating machine for boiling a sugar solution to be aerated at atmospheric pressure without subsequent vacuum treatment in said cooker; means for transferring the boiled solution into said pressure beating machine, and means for vacuumizing said solution in said pressure beating machine by an additional boiling under vacuum to obtain a substantially viscous sugar mass; means for mixing said solution in said pressure beating machine after vacuumizing with added whipping agent solution; means for beating thereafter the mixed solution in said pressure beating machine, and means for adding compressed air to produce an aerated sugar mass comprised substantially of cooked and vacuumized sugar solution, whipping agent solution, and air; said vacuumizing and said beating being carried out only in said pressure bearing machine; said vacuumizing means reducing the water content of said sugar mass through vaporization.

2. Apparatus as defined in claim 1, wherein additional ingredients are drawn by vacuum into said pressure beating machine.

3. Apparatus as defined in claim 2, wherein said additional ingredients include flavoring solutions.

4. Apparatus as defined in claim 2, wherein said additional ingredients include aromatic ingredients.

5. Apparatus as defined in claim 1, wherein said pressure beating machine comprises a steam-heated cooker for sugar solutions with a double jacket at the bottom of said pressure beating machine for steam heating; and means for transferring sugar solutions which after cooking are vacuumized and beaten into separate further processing means; and escape means through which evaporation vapors at said pressure beating machine can escape.

6. Apparatus as defined in claim 1, including temperature sensing means for monitoring vacuum in said pressure beating machine.

7. Apparatus as defined in claim 1, including connection means on said pressure beating machine for connecting to a vacuum generator.

8. Apparatus as defined in claim 1, including steam connection means on said pressure beating machine, said pressure beating machine having a cylindrical portion with a hemispherical base and having a double-walled portion in the region of said base and said cylindrical portion; a vapor valve and a vacuum pump, said pressure beating machine being operated at atmospheric pressure when said vapor valve is in an open state, said pressure beating machine being operated under vacuum by said vacuum pump dependent on the amount of aerated sugar mass to be produced.

9. Apparatus for batchwise production of aerated sugar masses comprising: a pressure beating machine; a separate cooker connected to said pressure beating machine for boiling a sugar solution to be aerated at atmospheric pressure without subsequent vacuum treatment in said cooker; means for transferring the boiled solution into said pressure beating machine, and means for vacuumizing said solution in said pressure beating machine by an additional boiling under vacuum to obtain a substantially viscous sugar mass; means for mixing said solution in said pressure beating machine after vacuumizing with added whipping agent solution; means for beating thereafter the mixed solution in said pressure beating machine, and means for adding compressed air to produce an aerated sugar mass comprised substantially of cooked and vacuumized sugar solution, whipping agent solution, and air; said vacuumizing and said beating being carried out only in said pressure beating machine; said vacuumizing means reducing the water content of said sugar mass through vaporization; valve means for spraying the cooked sugar solution to be vacuumized and drawing by vacuum the sprayed solution into said pressure beating machine; said pressure beating machine comprising a steam-heated cooker for sugar solutions with a double jacket at the bottom of said pressure beating machine for steam heating, means for transferring sugar solutions which after cooking are vacuumized and beaten into separate further processing means, and escape means through which evaporation vapors at said pressure beating machine escape; temperature sensing means for monitoring vacuum in said pressure beating machine; additional ingredients including flavoring solutions and aromatic ingredients being drawn by vacuum into said pressure beating machine; connection means on said pressure beating machine for connecting to a vacuum generator; steam connection means on said pressure beating machine, said pressure beating machine having a cylindrical portion with a hemispherical base and having a double-wall portion in the region of said base and said cylindrical portion; a vapor valve and a vacuum pump, said pressure beating machine being operated at atmospheric pressure when said vapor valve is in an open state, said pressure beating machine being operated under vacuum by said vacuum pump dependent on the amount of aerated sugar mass to be produced.

10. Apparatus for batchwise production of aerated sugar masses comprising: a pressure beating machine; a separate cooker connected to said pressure beating machine for boiling a sugar solution to be aerated at atmospheric pressure without subsequent vacuum treatment in said cooker; means for transferring the boiled solution into said pressure beating machine, and means for vacuumizing said solution in said pressure beating machine by an additional boiling under vacuum to obtain a substantially viscous sugar mass; means for mixing said solution in said pressure beating machine after vacuumizing with added whipping agent solution; means for beating thereafter the mixed solution in said pressure beating machine, and means for adding compressed air to produce an aerated sugar mass comprised substantially of cooked and vacuumized sugar solution, whipping agent solution, and air; said vacuumizing and said beating being carried out only in said pressure beating machine; said vacuumizing means reducing the water content of said sugar mass through vaporation; and valve means for spraying the cooked sugar solution to be vacuumized and drawing by vacuum the sprayed solution into said pressure beating machine.

* * * * *